J. L. GARLINGTON.
Thrashing Machine.

No. 10,669.

Patented March 21, 1854.

UNITED STATES PATENT OFFICE.

J. L. GARLINGTON, OF SNAPPING SHOALS, GEORGIA.

GRAIN-THRESHER.

Specification of Letters Patent No. 10,669, dated March 21, 1854.

*To all whom it may concern:*

Be it known that I, J. L. GARLINGTON, of Snapping Shoals, in the county of Newton and State of Georgia, have invented a new and useful Improvement in Threshing-Machines; and I do hereby declare that the following is a full, clear, and exact description of the same, reference being had to the accompanying drawings, forming part of this specification, in which—

Figure 3:
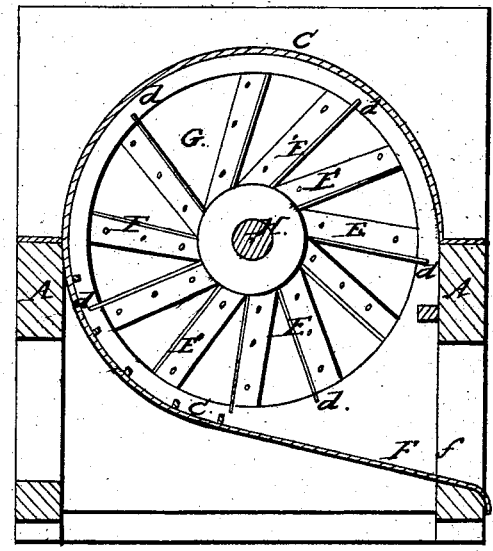
Figure 1:
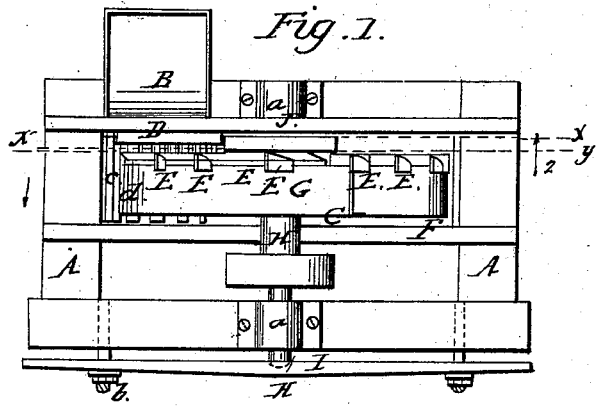
Figure 2:
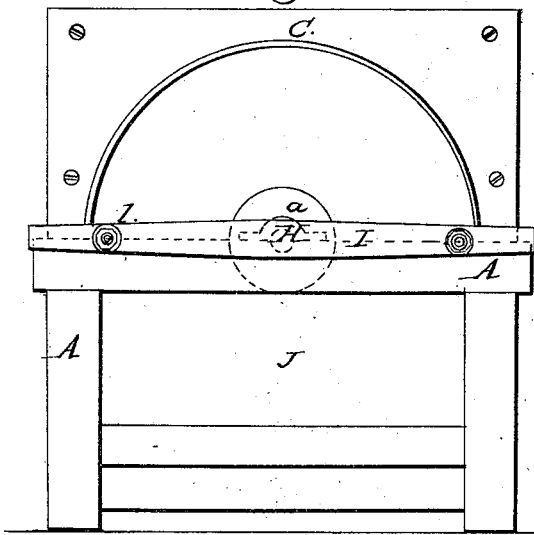
Figure 4:
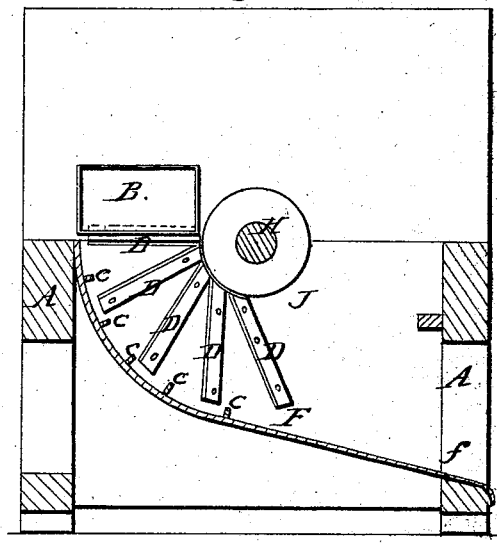

Figure 1, is a plan or bird's-eye view of the machine, the top section of the concave or box being removed. Fig. 2, is a side elevation of the machine complete. Fig. 3, is a vertical longitudinal section of the same through the line $x, x$, in Fig. 1, looking in the direction of the arrow 1, in same figure. This view shows the arrangement of the stationary strippers tangential to the axis of the disk. Fig. 4, is also a vertical longitudinal section of the machine, through the line $y, y$, in Fig. 1, and looking in the direction of the arrow 2. This view shows a face view of the threshing disk with its beaters or strippers, arranged tangentially to the disk shaft.

Wherever the same letters of reference occur in each of the several figures they indicate corresponding parts.

The nature of my invention consists in threshing grain in a more perfect manner than has ever been done before. By the employment of a vertical revolving adjustable springing disk having a series of beaters set tangentially to its axis around its face, and another series placed radially around its periphery in combination with a stationary concave having a series of stationary strippers arranged tangentially on the inner face of one of its sides directly under the passage where the grain is fed in, and another series of strippers placed radially for a short distance around its inner periphery. This arrangement effects several important objects, for by keeping the revolving disk in close relation to the stationary strippers by means of a spring an equal and yielding pressure upon the grain is secured and it is saved thereby from being injured, and the machine from choking. And as the said spring is adjustable, the pressure of the disk can be regulated to suit diffierent kinds of material being operated upon. And also by setting the revolving beaters, and stationary strippers upon a disk tangential to the axis of the disk instead of radially upon a shaft, the stripping operation is more effectual, and the feeding in of the article to be threshed is very rapid at the commencement, and then gradually slower until it falls into the discharge spout, and the grain is also saved from the injury arising from being subjected to centrifugal action and it has an oblique rolling motion given to it which is important. And lkewise by having the narrow periphery of the disk set with radial beaters, to operate with the radial strippers, on the inner periphery of the concave, and in combination with the beaters on the face of the disk arranged tangentially to the axis of the disk and strippers arranged tangentially on the side of the concave, the stripping of the grain from the stalk is effected more rapidly and perfectly than heretofore.

To enable others skilled in the art to make and use my invention, I will proceed to describe its construction and operation.

A, represents the frame of the machine; this may be made in the most suitable style.

B, is a shoe or hopper through which the grain to be threshed is introduced; it is situate on one side, and near one end of the box or concave C, in which the disk G, revolves, and a very short distance above the stationary strippers D D D D D, which are arranged tangentially to the shaft of the disk on the face of the concave, so that when the grain is fed in, it will rest against the strippers, and when the revolving beaters E, E, E, E, E, E, which are arranged tangentially on the face of the disk G to the axis of the same, come opposite the said strippers they will effectually and rapidly separate the kernel from the stalk at the point of feed; and thereby give the grain time to fall upon the discharge spout F, and escape through the passage $f$, and prevent its being carried round in a circle.

G is the disk hung fast on the revolving shaft H, and revolves with it; this disk has one of its faces set with tangential beaters E, as seen in Figs. 1, and 3; these beaters by being arranged tangentially to the axis of the disk G operate more effectually upon the grain. The shaft H, is hung in the bearings, $a, a$, which are on the top of the frame A, and is made yielding by means of the spring I, and consequently the disk is kept in close contact with the side J, of the concave C, which is set with strippers D, D, D, D, D, arranged tangentially to the axis of the disk, and at the same time is elastic or capable of yielding in case the machine should become clogged or choked. The spring I, bears on the end of the shaft H, and is made adjustable by the set screws b, b, and the disk can be set thereby to suit different kinds of grain being threshed. The arrangement of this spring and its adjustability, in combination with the beaters arranged tangentially to the axis of the disk, constitute the gist of my invention.

c, c, c, c, c, represent the stationary radial strippers which are arranged on the inner periphery of the concave near the feed passage; and d, d, d, d, d, d, designate the radial beaters arranged on the periphery of the revolving disk, as seen in Fig. 3. These beaters and strippers are for rendering the threshing operation more effectual.

The operation is simple: The grain to be threshed is introduced through the hopper and motion is communicated to the shaft which sets the disk in motion and its beaters come in close relation to the strippers and operate with them and strip the grain from the stalk; they being aided by the radial beaters and strippers; the grain as fast as threshed falling down into the inclined spout and escaping through the passage f.

What I claim as my invention, and desire to secure by Letters Patent, is—

The employment of a vertical revolving adjustable, and springing disk, made elastic by means of a spring bearing against the end of its shaft, and adjustable by set screws which pass through the ends of the spring, and throw it into action to a greater or less extent, according as they are turned, and having a series of beaters set tangentially to its axis around its face, and another series placed radially round its periphery, in combination with a stationary concave, having a series of stationary strippers arranged tangentially to the axis of the revolving disk on the inner face of one of its sides directly under the passage where the grain is fed in, and another series of stationary strippers placed radially for a short distance around its inner periphery; the whole being constructed, arranged, and operating in the manner herein set forth and shown, for the purpose of effecting the objects specified in the foregoing description.

J. L. GARLINGTON.

Witnesses:
JOHN M. HAZLETT,
B. J. FLOWERS.